US008005136B2

United States Patent
Kim et al.

(10) Patent No.: US 8,005,136 B2
(45) Date of Patent: *Aug. 23, 2011

(54) DUAL PDFE SYSTEM WITH FORWARD-BACKWARD VITERBI

(75) Inventors: Jin Hong Kim, Lake Zurich, IL (US); William Hillery, Schaumburg, IL (US)

(73) Assignee: Intersil Americas Inc., Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/758,664

(22) Filed: Apr. 12, 2010

(65) Prior Publication Data

US 2010/0266007 A1   Oct. 21, 2010

Related U.S. Application Data

(63) Continuation of application No. 11/405,352, filed on Apr. 17, 2006, now Pat. No. 7,697,604.

(51) Int. Cl.
H03K 5/159 (2006.01)
H03H 7/30 (2006.01)
H03H 7/40 (2006.01)

(52) U.S. Cl. ........ 375/233; 375/229; 375/232; 375/262; 375/341; 714/792

(58) Field of Classification Search .......... 714/792; 375/232, 233, 262, 265, 229, 341
See application file for complete search history.

(56) References Cited

U.S. PATENT DOCUMENTS

| 4,833,693 | A | 5/1989 | Eyuboglu |
| 5,583,889 | A | 12/1996 | Citta et al. |
| 5,600,677 | A | 2/1997 | Citta et al. |
| 5,604,769 | A | 2/1997 | Wang |
| 5,757,855 | A | 5/1998 | Strolle et al. |
| 5,761,237 | A * | 6/1998 | Petersen et al. ............ 375/148 |
| 5,933,462 | A | 8/1999 | Viterbi et al. |
| 6,012,161 | A | 1/2000 | Ariyavisitakul et al. |

(Continued)

OTHER PUBLICATIONS

Forney, G.D., et al., "The Viterbi Algorithm," IEEE, p. 268-278, (Mar. 1973). Narayanan, K.R., et al., "Performance of Trellis-Coded CPM with Iterative Demodulation and Decoding," IEEE, p. 676-687, (Apr. 2001).
S.W. Heo, et al., "A Concatenated Equalizer/Trellis Decoder Architecture for a Terrestrial Digital Television Receiver," IEEE, p. 813-819, (Apr. 2004).

*Primary Examiner* — Ted M Wang
(74) *Attorney, Agent, or Firm* — Pillsbury Winthrop Shaw Pittman LLP (57) ABSTRACT

The present invention provides a novel technique for improving the performance of equalizers by reducing the effects of error propagation in equalizers that use a Viterbi Decoder. Methods and systems are described that can improve the performance of equalizers by reducing the effects of error propagation in equalizers that use a Viterbi Decoder. Systems and methods of symbol correction in prediction decision feedback equalization ("pDFE") architectures are described. Systems are described that include one or more enhanced Viterbi decoders together with novel methods of symbol correction to obtain better system performance. Systems and methods are described that utilize dual pDFEs and can use a blending algorithm to reduce errors in symbol decoding. Dual pDFEs are described that include forward and backward Viterbi decoders wherein the backward Viterbi decoded may operate on time reversed data blocks and with some degree of latency. Forward and backward Viterbi decoders can generate different decoded symbols from the same equalized data. A blending algorithm is described for weighting results based on reliability of the respective decoded symbols. A forward-backward blender can additionally increase performance of the second pDFE by blending long delayed trellis symbols from the first Viterbi decoder with symbols output by the second Viterbi decoder.

20 Claims, 6 Drawing Sheets

U.S. PATENT DOCUMENTS

| | | | |
|---|---|---|---|
| 6,052,821 | A | 4/2000 | Chouly et al. |
| 6,088,405 | A | 7/2000 | Hladik et al. |
| 6,173,011 | B1 | 1/2001 | Rey et al. |
| 6,484,285 | B1 * | 11/2002 | Dent .............................. 714/791 |
| 6,591,395 | B1 | 7/2003 | Tsai |
| 6,651,215 | B2 | 11/2003 | Miyauchi et al. |
| 6,671,849 | B2 | 12/2003 | Tripathi et al. |
| 6,819,630 | B1 | 11/2004 | Blackmon et al. |
| 7,139,312 | B2 | 11/2006 | Graumann |
| 2002/0172275 | A1 | 11/2002 | Birru |
| 2004/0057535 | A1 | 3/2004 | Strolle et al. |
| 2005/0163209 | A1 | 7/2005 | Fimoff et al. |
| 2006/0064628 | A1 | 3/2006 | Stein et al. |

* cited by examiner

DUAL PDFE SYSTEM WITH FORWARD-BACKWARD VITERBI

CROSS-REFERENCE TO RELATED APPLICATIONS

This application is a continuation of U.S. patent application Ser. No. 11/405,352, entitled "DUAL PDFE SYSTEM WITH FORWARD-BACKWARD VITERBI" and filed on Apr. 17, 2006, (U.S. Pat. No. 7,697,604), and is related to U.S. application Ser. No. 11/405,349, entitled "REDUCING EQUALIZER ERROR PROPAGATION WITH A LOW COMPLEXITY SOFT OUTPUT VITERBI DECODER" filed on Apr. 17, 2006, (U.S. Pat. No. 7,697,642), which applications are incorporated herein by reference and for all purposes.

BACKGROUND OF THE INVENTION

1. Field of the Invention

The present invention relates to decoding of trellis-encoded signals and more particularly to systems and methods of symbol correction in predictive decision feedback equalization architectures.

2. Description of Related Art

Since the adoption of the Advanced Television Systems Committee ("ATSC") digital television ("DTV") standard in 1996, there has been an ongoing effort to improve the design of receivers built for the ATSC DTV signal as described in the ATSC standard A/54 (see U.S. patent application publication 20050163209 for . . . ). Designers face major obstacles in designing receivers that might achieve good reception is the presence of multipath interference in the channel. Multipath interference affects the ability of the receiver to correctly decode transmitted symbols. Therefore, designers often add equalizers to receivers in order to cancel the effects of multipath interference and thereby improve signal reception.

Figure 1:
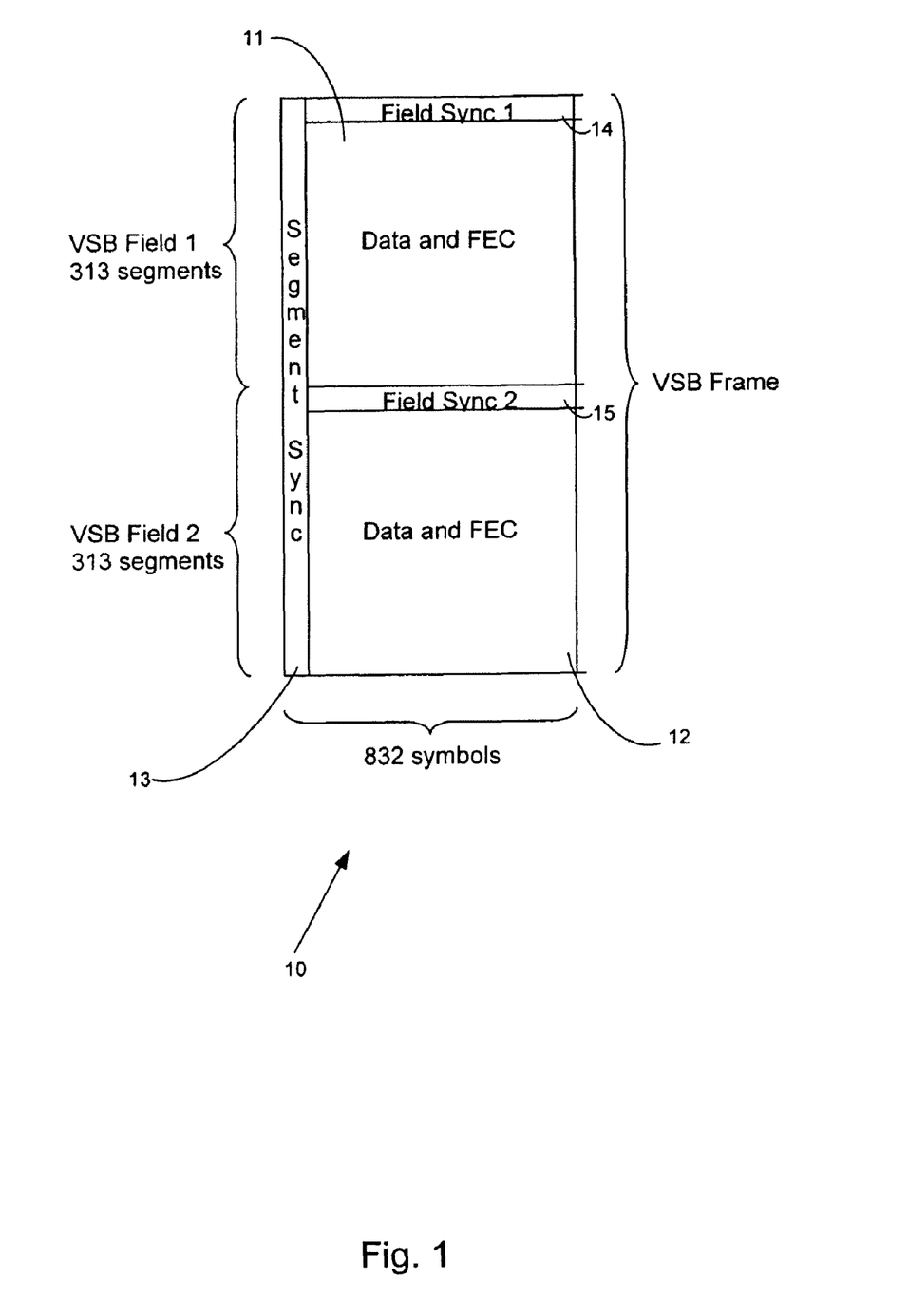
FIG. 1 depicts a frame in an ATSC DTV transmission system.

Referring to FIG. 1, in the ATSC DTV transmission system, data is transmitted in frames 10. Each frame 10 is composed of 2 fields 11 and 12, each field 11 and 12 having 313 segments, and each segment having 832 symbols. The first four symbols in each segment are segment sync symbols 13 having the sequence [+5, −5, −5, +5]. The first segment in each field is a field sync segment 14 and 15.

Figure 2:
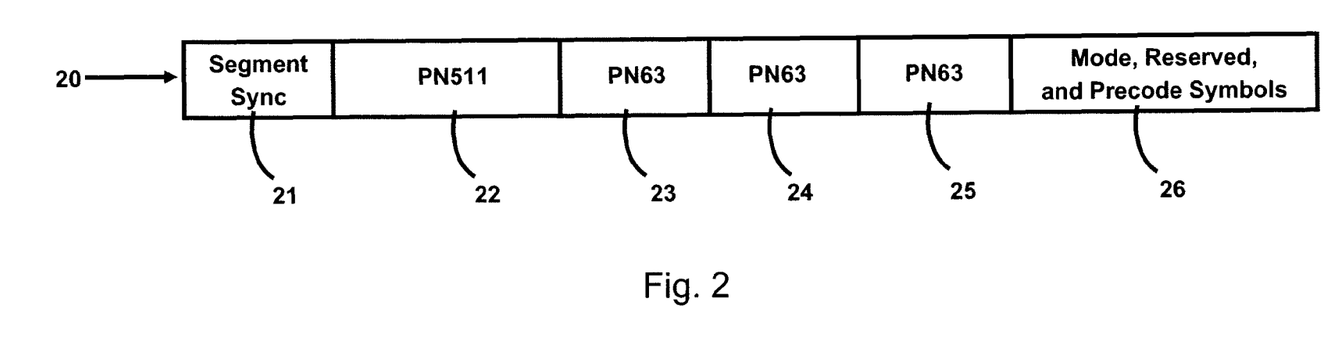
FIG. 2 depicts a field sync segment in a frame in an ATSC DTV transmission system.

Referring to figure shown in more detail in FIG. 2, field sync 20 comprises segment sync 21, a 511 symbol pseudo noise (PN511) sequence 22, a 63 symbol pseudo noise (PN63) sequence 23, a second PN63 sequence 24, a third PN63 sequence 25, and a 128 symbol sequence 26 composed of various mode, reserved, and precode symbols. The four PN sequences 22-25 are composed of symbols from the set {+5, −5}. In alternate fields, the three PN63 sequences 23-25 are the same. In the remaining fields, the first PN63 23 and third PN63 25 are the same while the second PN63 24 is inverted.

Figure 3:
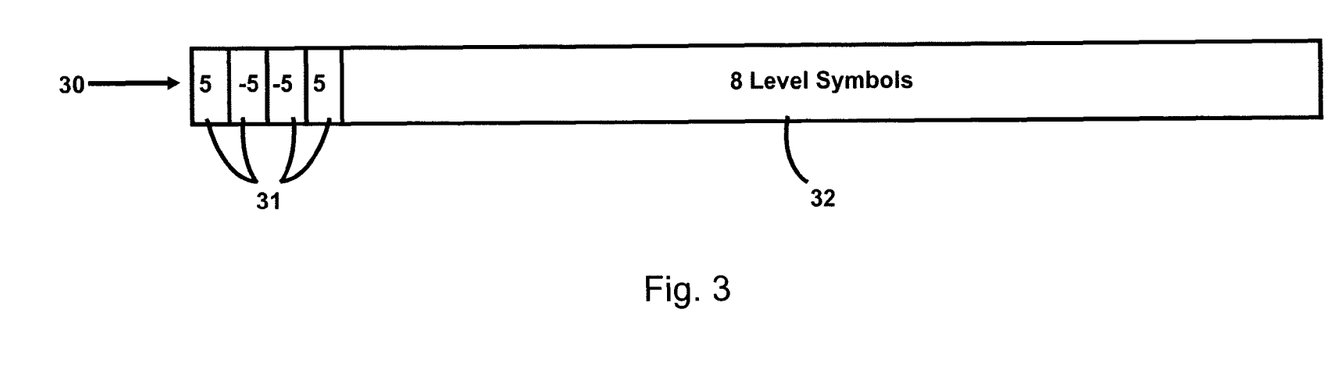
FIG. 3 depicts a data segment in a frame in an ATSC DTV transmission system.

As shown in FIG. 3, subsequent 312 segments 30 of the field 11 and 12 (referred to as data segments) are structured such that 828 symbols 32 following the four segment sync symbols 31 are trellis encoded by a 12 phase trellis encoder described in detail in ATSC standard A/54. This results in 8 level symbols derived from the alphabet {−7 −5 −3 −1 +1 +3 +5 +7}.

Figure 4:
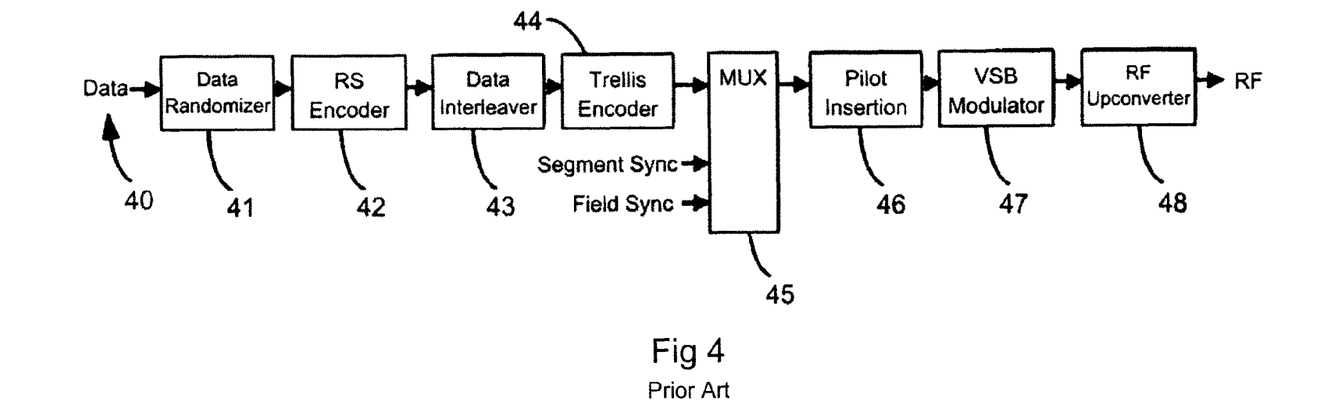
FIG. 4 illustrates an 8T-VSB transmitter.

Consider now an 8T-VSB transmitter such as is illustrated in FIG. 4. Input data 40 is first randomized 41, Reed-Solomon byte wise encoded 42, and then byte interleaved 43. Next the data is trellis encoded by a 12-phase trellis encoder 44. A multiplexer 45 adds the segment sync symbols and the field sync symbols to the trellis coded data at the appropriate times in the frame. Then, a pilot is inserted 46 by adding a DC level to the baseband signal and a modulator 47 modulates the resulting symbols to IF. Finally a RF upconverter 48 converts the signal for RF transmission as a vestigial sideband (VSB) signal at a symbol rate of 10.76 MHz.

Now consider a baseband model of the transmission channel fed by the above transmitter. The transmitted signal has a root raised cosine spectrum with a nominal bandwidth of 5.38 MHz and an excess bandwidth of 11.5% centered at one fourth of the symbol rate (i.e., 2.69 MHz). Thus the transmitted pulse shape q(t) is complex and given by $$q(t) = e^{j\pi F_s t/2} q_{RRC}(t),$$

where $F_s$ is the symbol frequency, and $q_{RRC}(t)$ is a real square root raised cosine pulse with an excess bandwidth of 11.5% of the channel. The pulse q(t) is referred to as the "complex root raised cosine pulse". For the 8T-VSB system, the transmitter pulse shape q(t) and the receiver matched filter pulse shape q*(−t) are identical since q(t) is conjugate-symmetric. Thus the raised cosine pulse p(t), referred to as the "complex raised cosine pulse", is given by $$p(t) = q(t) * q^*(-t)$$

where * denotes convolution, and * denotes complex conjugation. The transmitted baseband signal of data rate 1/T symbols/sec can be represented as:

$$s(t) = \sum_k I_k q(t - kT),$$

where $\{I_k \in A \equiv \{a_1, \ldots, a_8\} \subset R^1\}$ is the transmitted data sequence, which is a discrete 8-ary sequence taking values on the real 8-ary alphabet A. The physical channel between the transmitter and receiver is denoted c(t) and can be described by:

$$c(t) = \sum_{k=-L_{ha}}^{L_{hc}} c_k \delta(t - \tau_k)$$

where $\{c_k(\tau)\} \subset C^1$, $L_{ha}$ and $L_{hc}$ are the number of maximum anti-casual and casual multipath delays, $\tau_k$ multipath delay, and $\delta(t)$ is the Dirac delta function. Hence, the overall channel impulse response is:

$$h(t) = p(t) * c(t) = \sum_{-L_{ha}}^{L_{hc}} c_k p(t - \tau_k)$$

Figure 5:
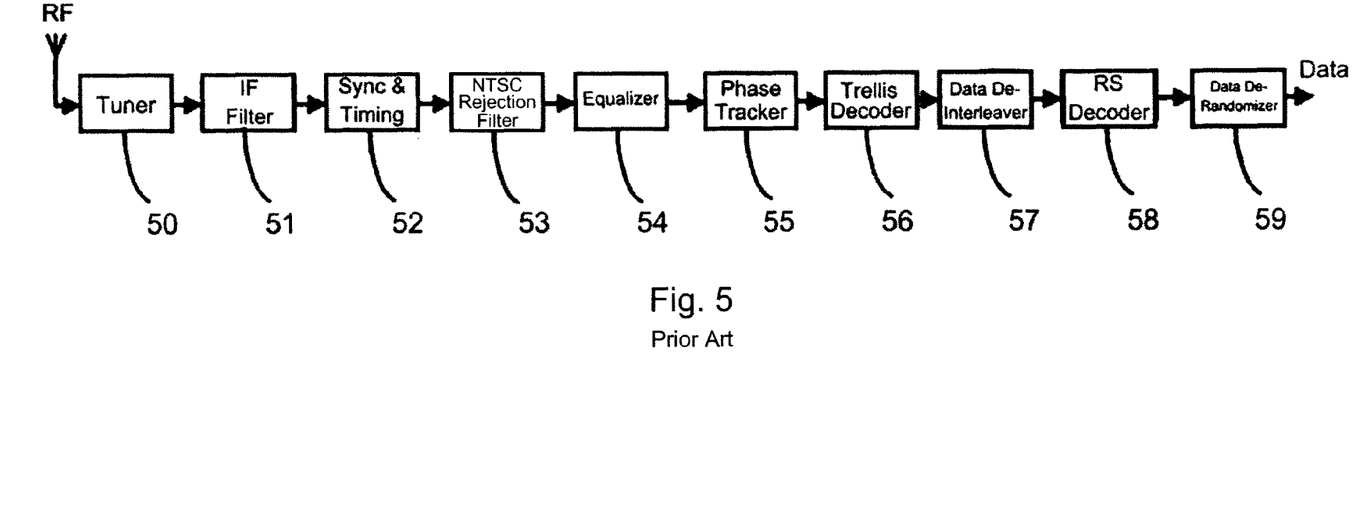
FIG. 5 shows an 8T-VSB receiver block diagram.

In the 8T-VSB receiver block diagram depicted in FIG. 5, tuner 50 and IF filter 51 demodulate an RF signal to baseband. Timing and synchronization recovery is performed 52 and any NTSC interference is rejected 53. Data is then equalized 54 and sent through a phase tracker 55 and trellis decoded 56, de-interleaved 57, Reed-Solomon decoded 58, and finally de-randomized 59. The matched filter output y(t) in the receiver prior to equalization is:

$$y(t) = \left(\sum_k \delta(t-kT)\right) * h(t) + v(t),$$

where $$v(t) = \eta(t) * q^*(-t)$$

denotes the complex (colored) noise process after the pulse matched filter, with η(t) being a zero-mean white Gaussian noise process with spectral density $\sigma_n^2$ per real and imaginary part. Sampling the matched filter output y(t) at the symbol rate produces the discrete time representation of the overall communication system according to the following equation:

$$y[n] = y(t)|_{t=nt} = \Sigma I_k h[n-k] + v[n]$$

Broadcast television channels are a relatively severe multipath environment due to a variety of conditions encountered in the channel and at the receiver. Only 728 symbols of a VSB field sync segment are known a priori and can be used as a training sequence for an adaptive equalizer. The channel is not known a priori, so the equalizer in the receiver must be able to adaptively identify and combat the various channel conditions. Since multipath signals in the broadcast channel may arrive many symbols after the main signal, the decision feedback equalizer (DFE) is invariably used in 8T-VSB applications. Another DFE structure that is well known is the noise predictive decision feedback equalizer (pDFE). Although both DFEs and pDFEs are good at combating multipath channels, both have the problem of error propagation. Error propagation occurs when there are errors in the feedback path. This, in turn, feeds erroneous data into the decision device resulting in incorrect symbol decisions. For 8T-VSB applications, the most commonly used decision device is the Viterbi Decoder. Therefore it is important to mitigate the effects of error propagation.

Since the 8T-VSB symbols are convolutionally coded, they may be decoded in the receiver with a Viterbi decoder [ATSC Standard A/54, U.S. Pat. No. 5,600,677, U.S. Pat. No. 5,583,889]. The Viterbi Algorithm (VA) for maximum likelihood sequence estimation of transmitted symbols corrupted by white noise is very well known (see "The Viterbi Algorithm", G. D. Forney, Jr., Proc. IEEE, vol. 61, pp. 268-278, March 1973, "Digital Communications—Fundamentals and Applications", Bernard Sklar, Prentice-Hall, 1988). The decoder may equivalently provide estimates of the encoded bit pairs or estimates of the mapped 8 level symbols, the later being utilized in the context of an equalizer. As is well known, the VA requires a path history memory for each state and involves add, compare, select operations based on trellis path metrics determined from sums of Euclidean distance branch metrics. As time advances, the most likely trellis paths (as indicated by the lowest path metrics) into each state of the trellis are saved, the rest are discarded. If the decoding algorithm searches back sufficiently deep in the trellis path memory, the result of discarding less likely paths—leaving only survivor paths—is a single surviving branch which defines the most likely symbol (hard symbol decision) at that prior point in time. At shallower path memory trace back depths (closer to the present time), there is a higher likelihood of multiple surviving branches with symbol probabilities proportional to the corresponding path metrics.

BRIEF SUMMARY OF THE INVENTION

The present invention provides a novel technique for improving the performance of equalizers by reducing the effects of error propagation in equalizers that use a Viterbi Decoder. Systems and methods of symbol correction in predictive decision feedback equalization ("pDFE") architectures are provided. More particularly, embodiments of the invention are described that include one or more enhanced Viterbi decoders together with novel methods of symbol correction to obtain better system performance. Embodiments of the invention utilize dual pDFEs and, in some embodiments, a blending algorithm reduces errors in symbol decoding.

Dual pDFEs are described that include forward and backward Viterbi decoders. The backward Viterbi decoder typically operates on time reversed data blocks and with a degree of latency. Under certain conditions, forward and backward Viterbi decoders can generate different decoded symbols from the same equalized data. The potential for unequal results typically increases under heavy multipath conditions. In certain embodiments, a blending algorithm is provided for weighting results based on reliability of the respective decoded symbols. A forward-backward blender can additionally increase performance of the second pDFE by blending long delayed trellis symbols from the first Viterbi decoder with symbols output by the second Viterbi decoder.

The present invention provides a novel technique for improving the performance of equalizers by reducing the effects of error propagation in equalizers that use a Viterbi Decoder. The foregoing and other aspects of various embodiments of the present invention will be apparent through examination of the following detailed description thereof in conjunction with the accompanying drawings.

BRIEF DESCRIPTION OF THE DRAWINGS

The present invention is illustrated by way of example, and not limitation, in the figures of the accompanying drawings in which like references denote similar elements, and in which.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the components referred to herein by way of illustration.

Certain embodiments provide systems and methods of symbol correction in pDFE architectures. Certain of the methods and systems described can also be applied to conventional decision feedback equalization ("DFE") architectures. Thus, it will be appreciated that systems and methods described in the context of pDFE architectures in this description can be applied to DFE architectures. Descriptions in the context of pDFE architectures permit a more complete yet efficient discussion of certain aspects of the invention.

Embodiments of the invention include two or more Viterbi decoders. Viterbi decoders typically implement a Viterbi algorithm ("VA") that can be described as follows for an S state trellis with a path memory of length M for each state that holds a sequence of state transitions and associated branch metrics:

At each time increment n
For each trellis state k
    Calculate the Euclidean branch metric for each branch into state k from all possible prior states at time (n−1)
    Add the above branch metrics to the associated path metrics for each possible prior state at time (n−1)
    Choose the path into state k at time n with the best path metric and store the path and the metric in the path memory associated with state k (overwriting the previous stored path)
Decode symbol
    Examine path memory back to time (n−M); if M is large enough, the path memories for each of the S states will show the same state transition at time (n−M) and hence indicate the same symbol; choose that symbol as the hard decision
    If the state transitions for time (n−M) are not the same, choose the state transition (and hence the symbol) corresponding to the path that has the best path metric from time (n−M) to time n In certain embodiments, Viterbi decoders can be adapted to output an M+1 long vector of symbol decisions with delays ranging from zero (corresponding to a time $t_n$) to M (corresponding to a time $t_{n-m}$) as follows. For each time increment n, the Viterbi decoder updates the metrics and returns a vector of symbols whose length is M+1, where M will be referred to as the trace back depth. Deep trace back depth symbols can be more accurate than shallow trace back depth symbols. As will be explained subsequently, trellis decoders may use this advantage in the feedback path of an adaptive equalizer. For a given time n, it is beneficial to update all M+1 symbols in the equalizer feedback path such that M trace back depth symbols will overwrite M previously decoded symbols in the feedback path, thus updating symbol decisions for times $t_{n-M}$ through $t_n$. This updating of more accurate symbols helps to reduce error propagation in the equalizer feedback path.

Figure 6:
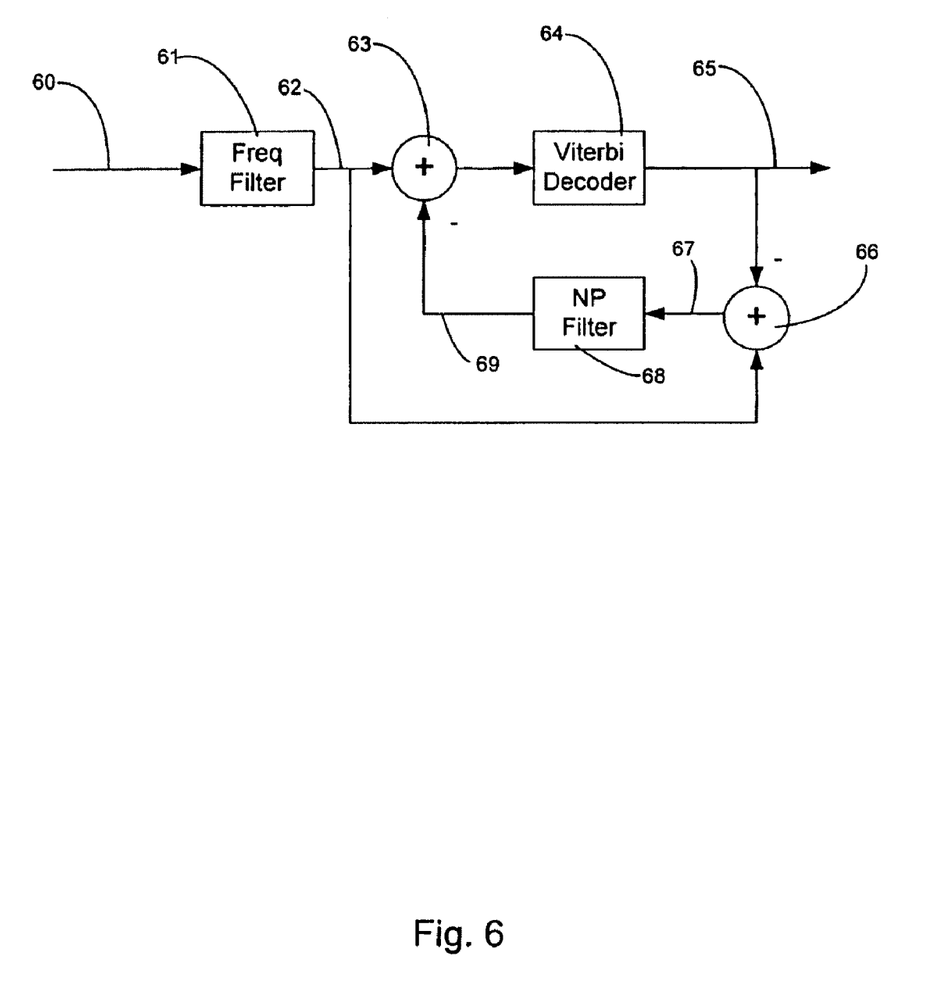
FIG. 6 illustrates predictive decision feedback equalization as included in certain embodiments of the invention.

Referring to FIG. 6, an example of a pDFE architecture is illustrated. A feed forward filter 61 performs block based frequency domain filtering on data received at an input 60 to provide filtered input 62. Typically, frequency domain filter 61 is block based and filtered input 62 consequently comprises a block of symbols. Summing element 63 adds filtered input 62 to noise prediction output 69 received from feedback filter 68. The summed output is then provided to Viterbi decoder 64. Viterbi decoder 64 provides the pDFE output 65. pDFE output 65 may be added to filtered input 62 using summer 66 to provide an error signal 67 representing differences between filtered input 62 and pDFE output 65. Error signal 67 is applied to feedback filter 68, which typically comprises a noise predictor. The noise predictor in the feedback loop can estimate colored (non-white) noise from error signal 67. Adder 63 may then subtract the estimated colored noise in noise prediction output 69 from the equalized data 62, thereby helping Viterbi decoder 64 to make better decisions.

In certain embodiments, Viterbi Decoder 64 can store metrics for a plurality of states including a smallest metric obtained, a previous state, and a current state. As discussed above, the metrics are typically used to configure or adjust a Viterbi algorithm that requires a path history memory for each state. The metrics can be based on trellis path metrics determined from sums of Euclidean distance branch metrics. The condition of the plurality of stored metrics is used to determine which symbol is decoded. If a delay is incurred, Viterbi Decoder 64 may be able to correct some symbols using trace back depth decoding.

Figure 7:
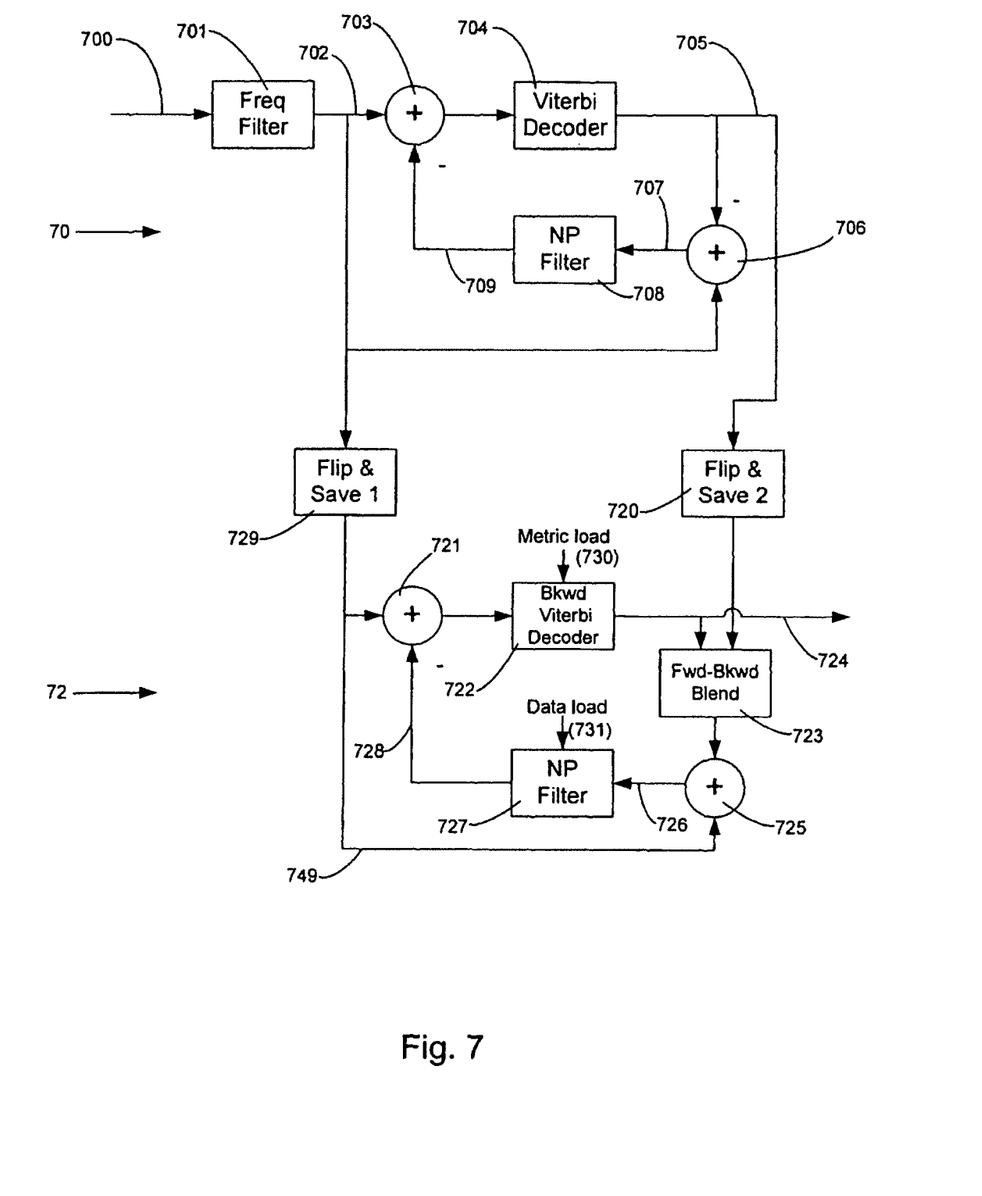
FIG. 7 depicts an example of an embodiment of the invention comprising dual pDFEs.

Referring now to FIG. 7, certain embodiments of the invention provide improved performance using two or more pDFEs, shown generally at 70 and 72. In the example depicted in FIG. 7, a system comprising two pDFEs 70 and 72 receives an input 700 and produces an optimized output 724. First pDFE 70 typically performs in the manner described above for the pDFE of FIG. 6 using forward Viterbi decoder 704. Second pDFE 72 comprises backward Viterbi decoder 722, second feedback filter 727 and forward-backward blender 723. Frequency domain filter 701 is typically block based and Viterbi decoder 704 can be configured to output a signal 705 comprising a block of symbols. These symbols can then be flipped using hardware or software flipping component 720 to provide a reversed order set of symbols. The reversed order set of symbols can be stored in general alignment with symbols provided at the output 724 of backward Viterbi decoder 722. Both forward and backward decoded symbols can then be provided to forward-backward blender 723 for processing using a blending algorithm.

Figure 8:
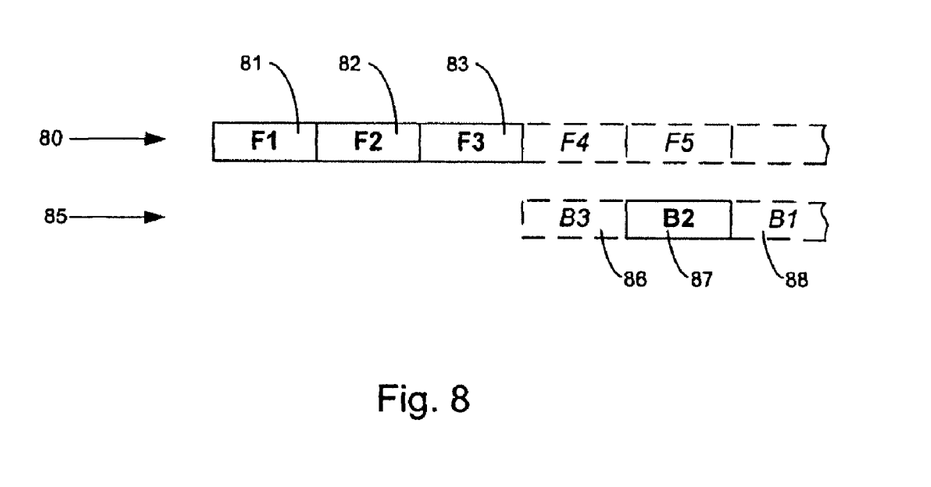
FIG. 8 illustrates the relationship between data blocks in the embodiment illustrated in FIG. 7.

Referring now to FIGS. 7 and 8, second pDFE 72 can be configured to operate on a signal comprising a time reversed data block that may incur some latency. In FIG. 8, F1 represents a first block of data 81 for first pDFE 70, F2 the second block of data 82 for first pDFE 70, F3 the third block of data 83 for first pDFE 70, and so on. Similarly, B1 represents the first block of data 88 for second pDFE 72, B2 the second block of data 87 for second pDFE 72, B3 the third block of data 86 for second pDFE 72, and so on. F blocks 80 are observable at signal 702 which is provided to flipping component 729. B blocks 85 are observable at signal 749 output by flipping component 729. Thus, B1 88, B2 87 and B3 86 are the flipped data of F1 81, F2 82 and F3 83, respectively. In order for B2 87 to be processed in second pDFE 72, a latter portion (typically, one half) of F1 81, all of F2 82, and all of F3 83 must be decoded from first pDFE 70. The symbols from the last half of F3 83 are used to preload the feedback filter 727. Then the backward Viterbi decoder decodes half of B3 86, all of B2 87, and half of B1 88 as shown in FIG. 8. It will be appreciated that, in some examples, the system may operate with fewer decoded symbols from first pDFE 70 such that latency is reduced; however, operation with fewer decoded symbols can result in degraded system performance.

Prior to decoding symbols in second pDFE 72, corresponding metric values received from first Viterbi decoder 704 can be used to initialize the metric values 730 for backward Viterbi decoder 722. Additionally, decoded symbols 731 provided by first pDFE 70 can be used to preload noise predictor 727 of second pDFE 72.

of the latterly-defined system 72 of FIG. 7 can be better understood by considering the following example with reference to FIGS. 4 and 8. Using a block length of 512 symbols, the latter half of symbols from F3 83 preload the noise predictor symbols for second pDFE 72. Second pDFE 72 can then begin decoding 1024 symbols (256 symbols of B3 86, 512 symbols of B2 87, and 256 symbols of B1 88), of which only the middle 512 symbols of B2 87 are typically output as backward decoded symbols. The remaining 512 symbols are decoded for optimizing the middle 512 symbols. It will be appreciated that backward Viterbi decoder 722 operates similarly to first Viterbi decoder 704, except that it decodes in the backward direction as visualized on a trellis diagram (see FIG. 9). This backwards action generates symbols 724 that may differ from symbols 705 generated by first Viterbi Decoder 704 output using the same equalized data 702. The potential for unequal results increases under heavy multipath conditions.

Having obtained symbols from forward Viterbi decoder 704 and backward Viterbi decoder 722, symbols from F2 82 and the corresponding symbols obtained by the backward Viterbi Decoder 722 from B2 87 are typically sent to forward-backward blender 723. Forward-backward blender 723 can increase performance of the second pDFE 722 by blending long delayed trellis symbols from the first Viterbi Decoder 704 with symbols output by the second Viterbi decoder 722. In certain embodiments, forward-backward blender 723 operates to select an output symbol from forward Viterbi decoder 704, backward Viterbi Decoder 722 or from a blended combination of forward Viterbi decoder 704 and backward Viterbi Decoder 722.

Figure 9:
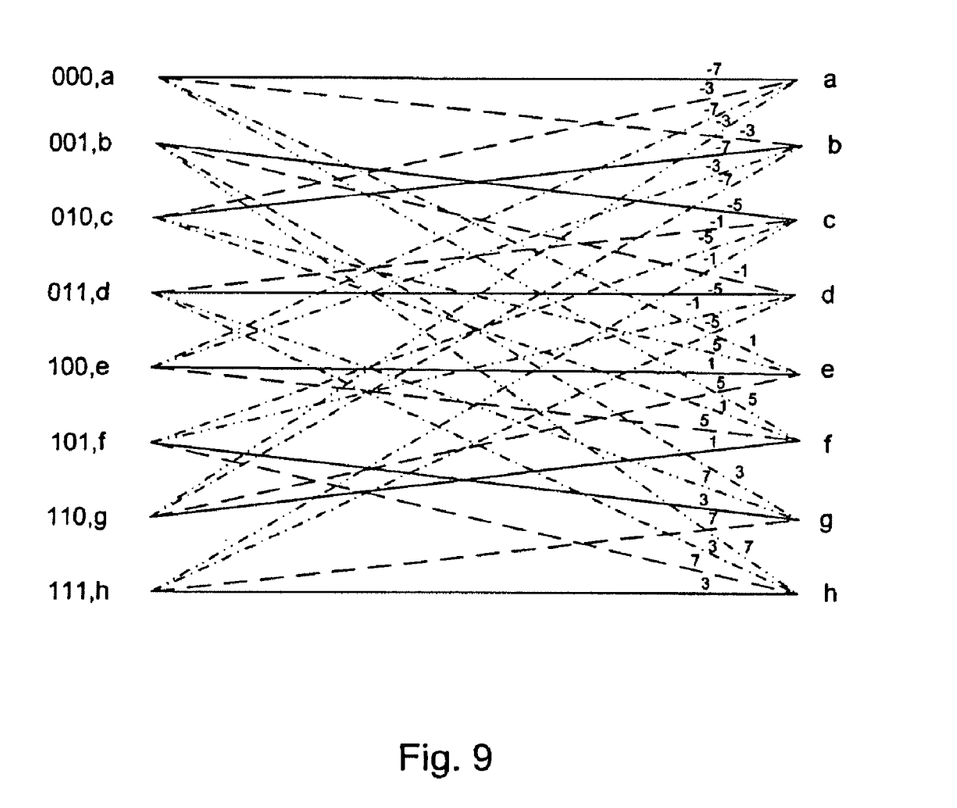
FIG. 9 depicts an 8-state trellis diagram for an 8T-VSB system.

The operation of forward-backward blender 723 can be best understood in consideration of certain generalities of 8-state trellis decoding. FIG. 9 shows an 8-state trellis diagram for an 8T-VSB system. In FIG. 9, at any given time instant n, there are 8 states and their corresponding survivor paths. When trace back depth decoding occurs at time n, the state with the lowest metric traces back its survivor path to decode the symbols. The lowest metric state at time n+1 may or may not contain the lowest metric state from time n. A main survivor path jump is identified when the lowest metric state at time n+1 contains the lowest metric state from time n. A main survivor path jump can occur under poor channel conditions. When a main survivor path jump occurs, a tally of differing symbols between the old survivor path and the new survivor path is taken. Unreliability of the sequence of decoded symbols increases with the size of the tally. This tally is typically taken every time a survivor path jump occurs.

Referring again to FIGS. 7 and 8, forward-backward blender 723 can execute a blending algorithm that is dependent on the tallies of the survivor path jumps in a plurality of Viterbi decoders. When a survivor path jump is identifiable, the difference between the common symbols in the survivor path at time n and the survivor path at time n+1 is tallied. Tallies are obtained for both forward decoder 704 and backward decoder 702. For each block, the tallies of each trellis decoder are summed up and represent an unreliability value. For example, in the 8T-VSB system, there are 12 trellis decoders and 12 unreliability values may be maintained for each block. Each unreliability value is the sum of the tallies for the corresponding trellis decoder. Thus, for every block, the unreliability of the decoded symbols of each trellis decoder is determined by the tallies. The forward-backward blending algorithm between forward Viterbi decoded symbols 705 and backward Viterbi decoded symbols 724 can be based upon this unreliability. If the unreliability of the symbols 705 obtained from forward Viterbi decoder 704 is a large value and the unreliability of symbols 724 from backward Viterbi decoder 722 is a small value, then, greater weight is given to symbols 724 obtained from backward Viterbi decoder 722. Similarly, if the unreliability of symbols 705 from forward Viterbi decoder 704 is a small value while the unreliability of the symbols 724 from backward Viterbi decoder 722 is a large value, greater weight is given to symbols 705 obtained from forward Viterbi decoder 704. On the other hand, if both the forward and backward Viterbi symbols unreliabilities are a similar value, then equal weighting can be given to both sets of symbols. For example, if scalar weighting factor a is associated with symbols 705 and scalar weighting factor b is associated with symbols 724, then a and b can be selected depending on the unreliability values as shown in Table 1. In Table 1, "<<," ">>" and "~=" denote "much less than," "much greater than" and "approximately equal to," respectively. The symbols received from blender 723 are the sum of a*forward_Viterbi_symbols and b*backward_Viterbi_symbols.

TABLE 1

| | Fwd Viterbi symbols unreliability << Bkwd Viterbi symbols unreliability | Fwd Viterbi symbols unreliability >> Bkwd Viterbi symbols unreliability | Fwd Viterbi symbols unreliability ~= Bkwd Viterbi symbols unreliability |
|---|---|---|---|
| a | 1.0 | 0.0 | 0.5 |
| b | 0.0 | 1.0 | 0.5 |

These blended symbols may also be used as the output symbols instead of 724, although some may be a soft value. If a hard value is desired, one would choose the backward decoded symbol 724.

In simulations using a block size of 512 and a trace back depth of 16, six different channels were tested. In comparison to the basic pDFE system in FIG. 6, the dual pDFE of FIG. 7 performs 0.1 dB better (SNR input can be 0.1 dB less) for AWGN, 0.4 dB better for Brazil A, 0.6 dB better for Brazil B, 1.0 dB better for Brazil C, 0.8 dB better for Brazil D, and 0.5 dB better for Brazil E. The AWGN channel has no multipath; only additive white Gaussian noise is introduced.

It is apparent that the above embodiments may be altered in many ways without departing from the scope of the invention. Further, various aspects of a particular embodiment may contain patentably subject matter without regard to other aspects of the same embodiment. Additionally, various aspects of different embodiments can be combined together. Also, those skilled in the art will understand that variations can be made in the number and arrangement of components illustrated in the above diagrams. It is intended that the appended claims include such changes and modifications.

What is claimed is:

1. A system comprising:
   a forward predictive decision feedback equalizer (pDFE) configured to provide forward Viterbi decoded symbols associated with an input signal;
   a backward pDFE configured to provide backward Viterbi decoded symbols associated with a time reversed representation of the input signal; and
   a forward-backward blender adapted to blend the forward Viterbi decoded symbols and the backward Viterbi decoded symbols to provide an output.

2. The system of claim 1, and further comprising a block based frequency domain filter for filtering the input signal.

3. The system of claim 1, wherein the forward pDFE includes:
   a forward Viterbi decoder for generating the forward Viterbi decoded symbols; and a forward feedback filter adapted to provide an estimate of noise in the forward Viterbi decoded symbols, wherein the forward Viterbi decoder is configured to receive data representative of the input signal offset by the estimate of noise in the forward Viterbi decoded symbols.

4. The system of claim 3, wherein the backward pDFE includes:

a backward Viterbi decoder for generating the backward Viterbi decoded symbols; and a backward feedback filter adapted to provide an estimate of noise in the output, wherein the backward Viterbi decoder is configured to receive the time reversed representation of the input signal offset by the estimate of noise in the blended output.

5. The system of claim 4, wherein the backward Viterbi decoder is selectively configured using metrics obtained from the forward Viterbi decoder.

6. The system of claim 4, wherein the loading of backward feedback filter symbols is configured using selected portions of the forward Viterbi decoded symbols.

7. The system of claim 1, and further comprising an input flipper operative to provide the time reversed representation of the input signal, wherein the input flipper is adapted to receive a set of symbols associated with the input signal and store the set of symbols in reverse order.

8. The system of claim 1, and further comprising an output flipper adapted to store the forward Viterbi decoded symbols in reverse order.

9. The system of claim 8, wherein the forward-backward blender is configured to blend the reverse order forward Viterbi decoded symbols and the backward Viterbi decoded symbols.

10. The system of claim 1, wherein the forward-backward blender is configured to blend the forward Viterbi decoded symbols and the backward Viterbi decoded symbols based on comparison of reliability of the forward and backward Viterbi decoded symbols.

11. A method comprising:

obtaining forward Viterbi decoded symbols from an input signal;

deriving backward Viterbi decoded symbols from a time-reversed representation of the input signal;

calculating reliability information for the forward and backward Viterbi decoded symbols; and generating optimized output symbols based on the reliability information.

12. The method of claim 11, wherein the step of generating output symbols includes blending the forward Viterbi decoded symbols and the backward decoded symbols.

13. The method of claim 12, wherein blending includes using a forward-backward blender.

14. The method of claim 13, and further comprising the steps of:

providing a time-reversed representation of the input signal using an input flipper adapted to receive a set of symbols associated with the input signal; and storing the set of symbols in reverse order.

15. The method of claim 14, wherein the forward-backward blender is configured to blend the time-reversed representation of the forward Viterbi decoded symbols and the backward Viterbi decoded symbols.

16. The method of claim 13, wherein forward-backward blender is configured to blend the forward Viterbi decoded symbols and the backward Viterbi decoded symbols by comparing reliability of the forward and backward Viterbi decoded symbols.

17. The method of claim 16, wherein reliability of the forward and backward Viterbi decoded symbols is calculated from selected survivor path tallies.

18. The method of claim 13, wherein forward-backward blender is configured to blend the forward Viterbi decoded symbols and the backward Viterbi decoded symbols based on the reliability information.

19. The method of claim 11, and further comprising the step of storing the forward Viterbi decoded symbols in time-reversed order using an output flipper.

20. An equalizer comprising:

a forward Viterbi decoder for generating forward Viterbi decoded symbols;

a backward Viterbi decoder for generating backward Viterbi decoded symbols;

a forward feedback filter adapted to provide an estimate of noise in the forward Viterbi decoded symbols;

a backward feedback filter adapted to provide an estimate of noise in an output selected from the forward Viterbi decoded symbols and the backward Viterbi decoded symbols; and a forward-backward blender adapted to provide a blended output from the forward Viterbi decoded symbols and the backward Viterbi decoded symbols, wherein the forward Viterbi decoder is configured to receive data representative of an input signal offset by the estimate of noise in the forward Viterbi decoded symbols, the backward Viterbi decoder is configured to receive a time-reversed representation of the input signal offset by the estimate of noise in the blended output, and the forward-backward blender is configured to blend the forward Viterbi decoded symbols and the backward Viterbi decoded symbols by comparing reliability of the forward and backward Viterbi decoded symbols.

* * * * *